Figure 1:
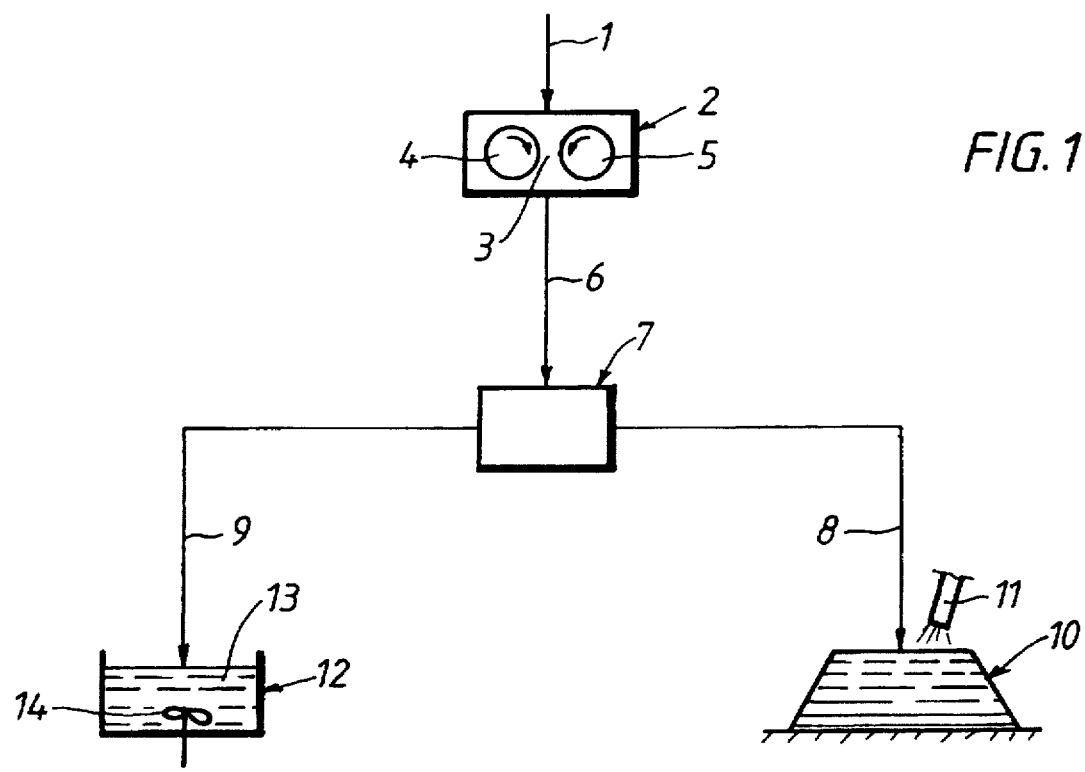

United States Patent [19]
Patfelt et al.

[11] Patent Number: 5,642,863
[45] Date of Patent: Jul. 1, 1997

[54] METHOD OF EXTRACTING METALS FROM ORE MATERIAL

[75] Inventors: Norbert Patzelt, Beckum; Johann Knecht, Wadersloh, both of Germany

[73] Assignee: Krupp Polysius AG, Beckum, Germany

[21] Appl. No.: 626,209

[22] Filed: Mar. 29, 1996

[30] Foreign Application Priority Data

Apr. 4, 1995 [DE] Germany ............. 195 12 498.7

[51] Int. Cl.$^6$ ............................. B02C 19/12
[52] U.S. Cl. ............... 241/24.13; 241/24.15; 241/29
[58] Field of Search ............... 241/20, 24.13, 241/24.15, 29

[56] References Cited

U.S. PATENT DOCUMENTS

| | | | |
|---|---|---|---|
| 3,420,453 | 1/1969 | Tada et al. | 241/15 X |
| 3,589,622 | 6/1971 | Weston | 241/16 |
| 3,853,535 | 12/1974 | Szabo Nee Mogyorosi et al. | 241/21 |
| 4,960,461 | 10/1990 | Esna-Ashari et al. | |

FOREIGN PATENT DOCUMENTS 1115677  1/1982  Canada ............. 241/24.15

Primary Examiner—John M. Husar
Attorney, Agent, or Firm—Learman & McCulloch

[57] ABSTRACT

In this method according to the invention for extracting metals, starting ore material is subjected to material bed comminution and then leached by the addition of leaching fluid. In order to be able to ensure an optimal yield of metals even in the case of greatly differing particles sizes of the comminuted ore material, the comminuted ore material is divided into oversize material and fine material, whereupon oversize material is delivered to a heap leaching and fine material to a tank leaching.

19 Claims, 6 Drawing Sheets

METHOD OF EXTRACTING METALS FROM ORE MATERIAL

The invention relates to a method of extracting metals from ore material.

It is already generally known that in order to extract metals from corresponding ore material so-called heap leaching can be employed. In this way, for example, gold and copper can frequently be extracted relatively economically. In this heap leaching the starting ore material is crushed or comminuted, whereupon the comminuted product is put onto a heap or onto a pile in which all ore particles are in close contact with neighbouring ore particles. In order to carry out this heap leaching a leaching agent or a leaching fluid is distributed over the heap or the pile, so that the metal contained in these ore particles should be released.

An example of the heap leaching explained above can be seen for instance From U.S. Pat. No. 4,960,461. From this it is also known for the comminution of ore material containing precious metal to be carried out in a type of material bed roll mill. In this case a binder can be previously admixed with the starting ore material so that fine fractions from the comminution process should be bound to larger particles in order to make the heap permeable for the leaching fluid. In this known method the comminuted product coming from the material bed comminuting mill is fed directly to the heap without further treatment.

It is basically also already known in the art for the ore particles to be introduced into a tank containing a leaching fluid for leaching ore material containing metal and for the resulting suspension to be stirred so that the leaching fluid can act as far as possible on the entire particle surfaces.

Although the known methods each have their specific properties in the extraction of metals from corresponding ore materials, it has been shown repeatedly that an even higher yield of metals from the ore material is desirable.

The object of the invention, therefore, is further to develop a method in such a way that an optimal yield or extraction of the metals contained in the starting ore material can be ensured.

This object is achieved by the method steps according to the invention.

Advantageous embodiments and further developments are the subject matter of the invention.

In the tests on which the invention is based it has been shown that on the one hand certain standards must be set for the comminuted ore material as regards the degree of comminution thereof and on the other hand the particular advantages on the one hand of the heap leaching and on the other hand of tank leaching are limited to specific grain size distributions of the comminuted ore material. Accordingly, according to this invention the comminuted ore material from the material bed comminution is divided into oversize material and fine material in an advantageous manner in a—subsequent—classification stage, whereupon at least a fraction of the oversize material is subjected to heap leaching and at least a fraction of the fine material is subjected to tank leaching using a stirring movement.

Thus in this invention the particular comminution properties of material bed comminution (in a material bed roll mill) are exploited in an advantageous manner in such a way that the said oversize material fraction is delivered to the heap leaching in which the particles of oversize material or agglomerates of oversize material leave sufficiently pore-like interstices between them without these interstices being obstructed by finer particles of material, so that an extremely uniform permeability can be achieved for the leaching agent (leaching fluid) which is distributed over the heap, which in turn favours the desired optimal extraction or yield of the metals contained in the ore particles of this oversize material. Furthermore the admission of atmospheric oxygen into the pile is made easier and thus the leaching itself is positively influenced, which is quite especially important in the leaching process for precious metals. At the same time, in the tank leaching which is particularly suitable therefor the fine ore particles of the comminuted product can also be subjected to an extremely specific and optimal extraction of the metals contained therein. Thus by this method according to the invention it can be ensured that the metals contained in the starting ore material—after its comminution in a material bed roll mill—can also be extracted as thoroughly as possible even when the particle sizes of the comminuted product differ greatly. Therefore according to the invention the procedure is such that the different grain size ranges of the comminuted ore material are delivered to the type of leaching which is most suited to them, the heap leaching and tank leaching being carried out simultaneously and parallel to one another for the fine material fraction on the one hand and the oversize material fraction on the other hand.

When metals are extracted from ore material in this particularly economical way, in the comminution of the starting material in the material bed comminution particular care is taken to ensure that the quantity of superfine material which could hinder the leaching process and thus the yield of metal is reduced to a minimum;

the largest possible surface area is created by the microcracks and inter-particle breaks originating from the material bed comminution which is known per se;

an iron contamination of non-ferrous metals, which results for instance from abrasion of apparatus parts which could markedly decrease the yield of metal during the leaching process or could increase the consumption of leaching fluid and would thus impair the economy of such a method, is reduced or decreased to a minimum;

flaking of metal particles, which are released during comminution and prevent a close bonding of these released particles with other components of the comminuted product, is eliminated or reduced to a minimum;

the grinding energy necessary in order to achieve the desired grain size distribution of the ore particles in the comminuted product is reduced to a minimum.

With this metal extraction according to the invention the energy consumption for a particularly thorough comminution of the ore material can be markedly reduced, and also an additional consumption for particularly high leaching capacity (additional leaching tanks or the like) as well as for other equipment connected downstream, such as for example thickeners, are not necessary in this case, so that a particularly high level of economy is achieved for this method according to the invention.

As a consequence of the high permeability of the pile built up from oversize particles it is possible to achieve a higher pile without the leaching being unfavourably influenced. As the floor area can be minimised in this way, further savings result due to shorter transport distances and lower costs for the lining of the stockpile floor (this lining is generally achieved with the aid of films in order to collect lye and to prevent penetration into the stockpile floor).

Depending upon the type of starting ore material and accordingly depending upon the nature of the comminuted product the classification of the comminuted ore material into oversize material and fine material can be carried out according to the invention for example in a screening device.

It may also be advantageous, for example for an improvement in the capacity for drawing in the ore material into the grinding gap, for an adjustable fraction of the comminuted ore material to be separated off before the classification and recirculated to the material bed comminution, that is to say into the grinding gap between the two rolls.

However, for approximately the same purpose it may also be advantageous to branch off an adjustable fraction of the oversize material obtained in the classification and to recirculate this to the material bed comminution, whilst the remaining fraction of the oversize material is delivered to the heap leaching.

When the starting ore material is present in particularly large lumps, it may also be advantageous if the ore material is first of all pre-comminuted in a corresponding comminuting arrangement (e.g. in a conventional primary crusher) before its material bed comminution.

In a further embodiment of the invention it is proposed that at least an adjustable fraction of the fine material obtained in the classification (or even the entire fine material) is subjected before the tank leaching to an additional fine comminution for further breaking up of this fine material. This further fine comminution of the fine material can—depending upon the nature and the type of the ore material—be carried out in any suitable comminuting arrangement, particularly in a ball mill, an agitator mill or also in a further material bed roll mill.

According to a further proposal of this invention, before the tank leaching and before any additional fine comminution (as has been described above) the fine material coming from the classification stage after the (first) material bed comminution can be subjected to a further material concentration, in which a concentrate containing a relatively high fraction of valuable substance is drawn off from this fine material. This concentrate which is drawn off can for example be sold directly or melted, but in any case it no longer loads the rest of the fine material fraction to be delivered to the tank leaching, which further favours the particularly economical yield of the valuable ore material.

The fine material obtained in the classification after the first material bed comminution can also first of all be subjected in an advantageous manner to a roughing flotation in which likewise a fraction of already exposed valuable substance is led of from the fine material and thus a concentrate is produced, whilst the remaining fine material is by choice either delivered directly to the tank leaching or is first of all subjected to an additional fine comminution— as explained above—and then delivered to the tank leaching. This measure also relieves the load on the tank leaching and thereby promotes the particularly economical yield of the valuable metal material. If this roughing flotation takes place before the additional fine comminution, this also means that overgrinding of already exposed valuable metal materials is largely avoided.

Since a roughing flotation arrangement or cell can also receive large feed sizes (e.g. 20 mm), it may also be sensible to carry out a roughing flotation directly after the material bed roll mill and before the classifying device which precedes this roll mill. Moreover, there is also the alternative possibility that the oversize material coming from this classification and to be delivered to the heap leaching may be subjected to a roughing flotation. Thus valuable substances in the form of an ore concentrate can also be extracted from the oversize material at the aforementioned locations, so that the equipment disposed downstream of these roughing flotations can be correspondingly relieved of load.

In the tank leaching of the fine material or the fine material fraction, care should also be taken to ensure that this tank leaching is carried out with a constant stirring movement in such a way that at least the majority of the fine material particles, and if possible all of them, are kept out of contact with one another. By this type of stirring movement during the tank leaching the entire surface of all ore particles should as far as possible be kept in contact with leaching fluid. This measure also contributes to a particularly thorough yield of the valuable metal material from the starting ore material.

These and further details of the invention are set out in the following explanation of several embodiments which are illustrated in the drawings, the drawings having been kept quite schematic. Thus FIGS. 1 to 12 show, largely in the form of block diagrams, various embodiments of apparatus for carrying out this method according to the invention, the same reference numerals being used for the same and similar parts in all figures or examples, so that a repeated explanation of these similar parts can be largely omitted.

All the illustrated embodiments relate quite generally to the recovery or extraction of metals from corresponding ore material. This ore material or starting ore material which is symbolised by 1 is delivered to a material bed roll mill 2 which is known per se in which it is subjected to material bed comminution in a manner which is known per se in the grinding gap 3 between two rolls 4, 5 which are pressed against one another with high pressure and are driven so as to revolve in opposite directions. The comminuted product (arrow 6) is to be leached by the addition of leaching fluid.

According to the first embodiment illustrated in FIG. 1, the comminuted product 6 coming from the material bed roll mill 2 is delivered to a classification stage in the form of a classifier 7 in which the comminuted product 6 is divided into oversize material (arrow 8) and fine material (arrow 9). Thereupon all of the oversize material 8 is—according to FIG. 1—delivered to a heap 10 for carrying out heap leaching, i.e. the oversize material is evenly spread out or distributed on a type o pile and built up into a heap 10 over which a suitable leaching fluid (as known) is evenly distributed with the aid of suitable delivery arrangement 11.

On the other hand, all of the fine material—likewise according to FIG. 1—is introduced into a leaching tank 12 in which are located a sufficient quantity of a suitable leaching fluid 13 as well as a suitable stirring arrangement 14, so that tank leaching of the fine material 9 can be carried out with constant stirring movement (with the aid of the stirring arrangement 14) in such a way that at least the majority of the fine material particles introduced into the leaching tank 12 or into the leaching fluid 13 thereof are kept out of contact with one another.

Any suitable device may be used as the classifier. A screening device which is known per se is particularly suitable for this.

Figure 2:
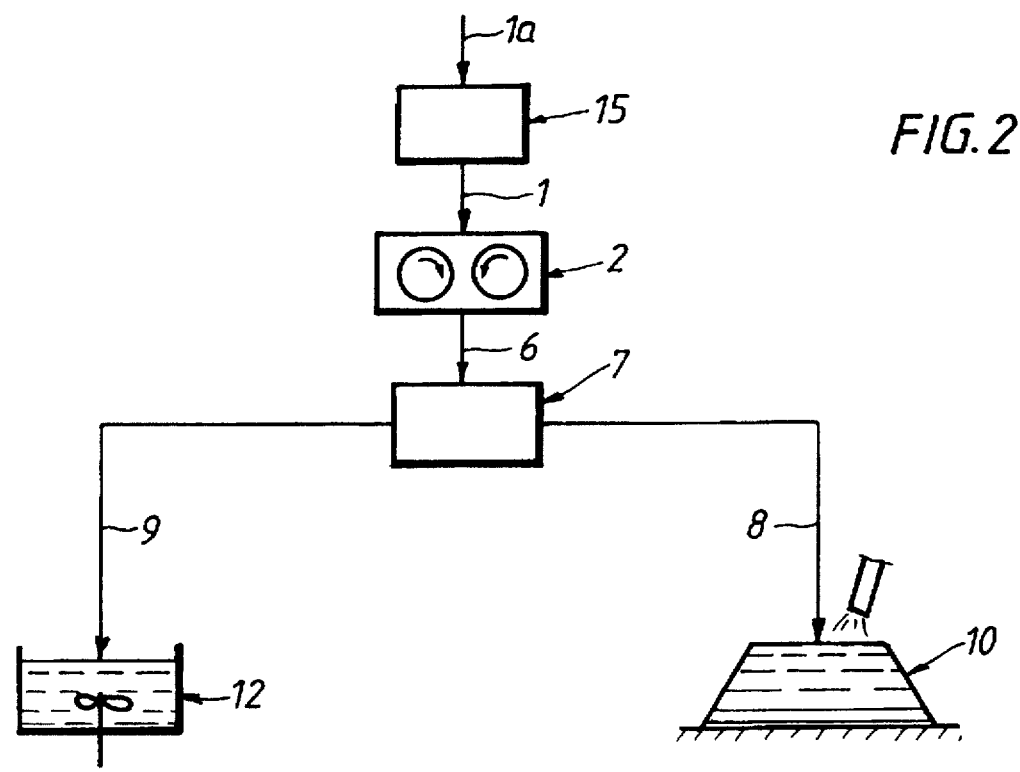

The embodiment illustrated in FIG. 2 is largely identical to that previously explained with reference to FIG. 1, but with the exception that a pre-comminuting arrangement 15, for example a suitable roll crusher or the like, is disposed before the material bed roll mill 2, so that starting ore material which is in particularly large lumps can be sufficiently pre-comminuted before it undergoes material bed comminution. In this way the prerequisite for optimal material bed comminution in the material bed roll mill 2 is created.

Figure 3:
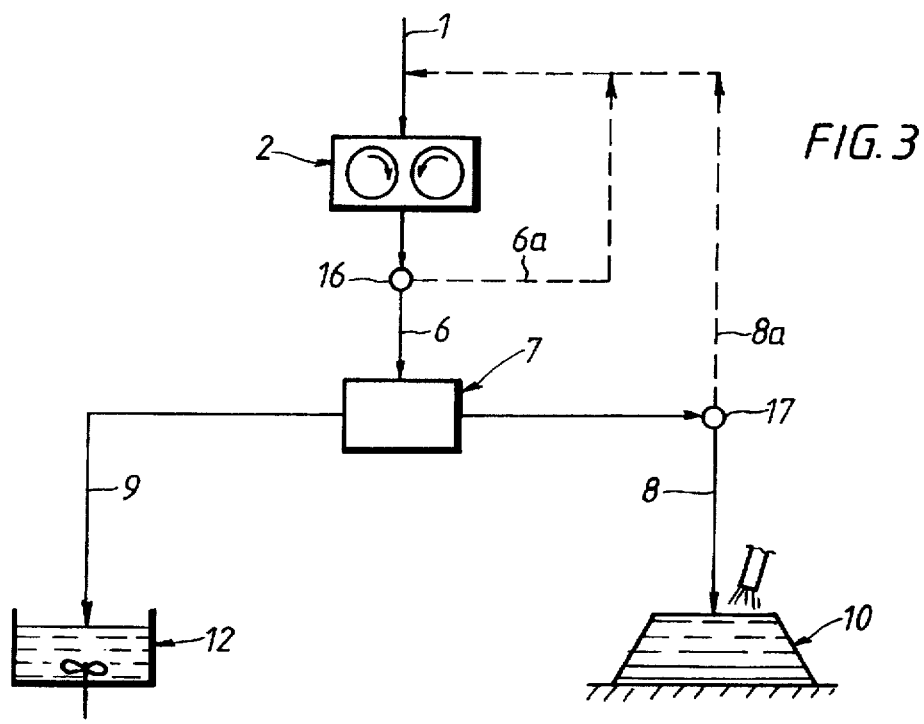

Also the embodiment according to FIG. 3 is based on the basic construction described with reference to FIG. 1. In this third embodiment (FIG. 3), on the route between the material bed roll mill 2 and the classifier 7 it can be ensured, for instance with the aid of a distribution device 16, that—as indicated by broken lines—an adjustable fraction 6a of the comminuted product 6 from the material bed roll mill 2 is separated off before the classification in the classifier 7 and recirculated to the material bed comminution in the material bed roll mill 2.

As an alternative to the previously described recirculation of a fraction of the comminuted product 6 or also parallel thereto, with the aid of a further distribution device 17 an equally adjustable fraction 8a can be branched off from the oversize material obtained in the classification in the classifier 7 and likewise recirculated into the material bed roll mill for material bed comminution, whilst the remaining fraction of the oversize material 8 is delivered as before to the heap leaching on the heap 10.

Figure 4:
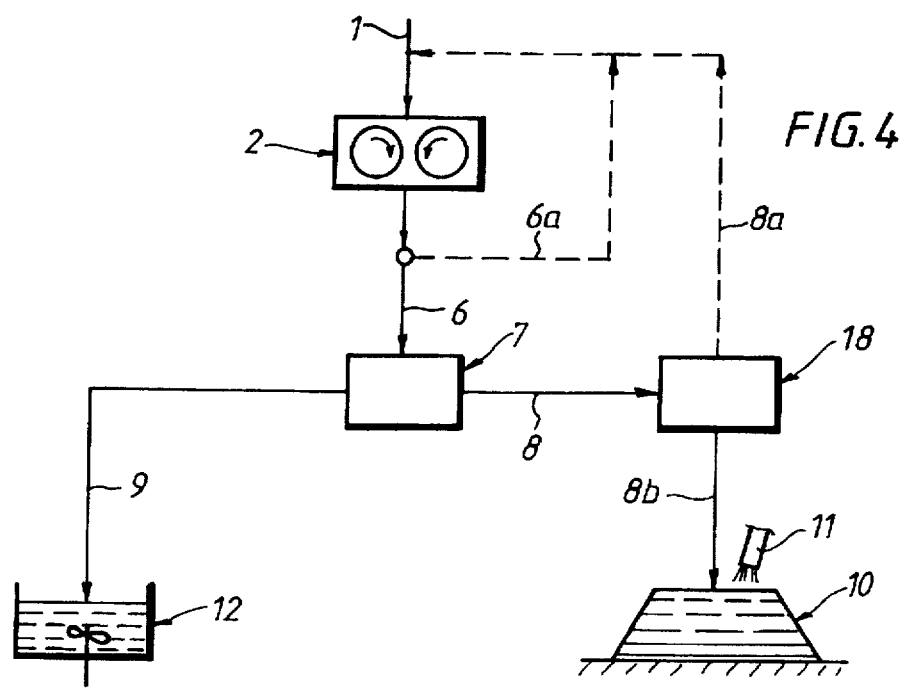

FIG. 4 shows a variant of the previously described example according to FIG. 3. According to this the oversize material obtained in the classification in the classifier 7 is delivered to a second classification in a second classifier 18, which can likewise be a screening device which is known per se. This second classifier 18 serves in this embodiment (FIG. 4) for dividing the oversize material 8 into a coarser (FIG. 4) oversize material fraction 8a which—in the example of FIG. 3—is recirculated to the material bed roll mill 2, whilst the finer oversize material fraction 8b is put on the heap 10 and is there leached by the uniform addition of leaching fluid (through the delivery arrangement 11) over the surface of the heap.

Figure 5:
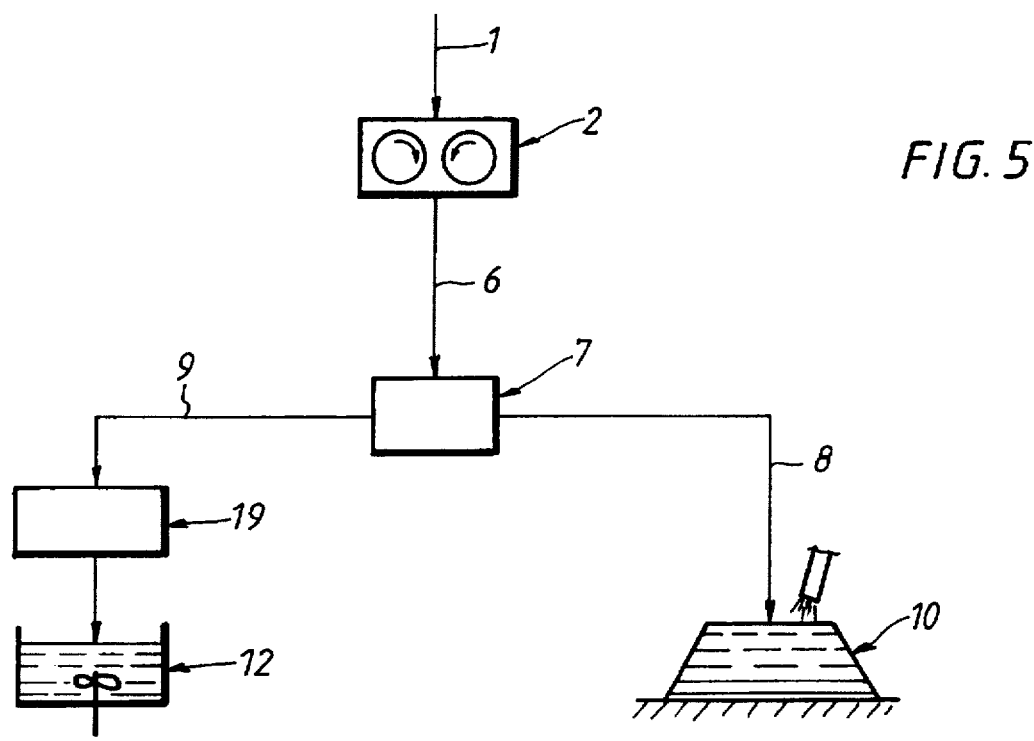

In the embodiment according to FIG. 5 the oversize material 8 separated off in the classifier 7 is delivered to the heap leaching on the heap 10 in the same way as in the first embodiment (FIG. 1), whilst before the leaching in the tank 12 the fine material 9 coming from the classifier 7 is first of all supplied to an additional fine comminution in a fine comminuting device 19. This procedure is brought to bear above all when because of the ore material to be processed it is regarded as advantageous for this fine material 9 to be somewhat further broken up in order to be able to achieve the desired far-reaching yield of all metal fractions contained therein.

Basically, any suitable type of fine comminuting device can be used for this additional fine comminution of the fine material 9; however, it is particularly preferred if this fine comminuting is carried out in a ball mill which is known per se an agitator mill or also in a further material bed roll mill, which is then as the fine comminuting device 19 adjusted in particular to the grain size spectrum in question here.

Figure 6:
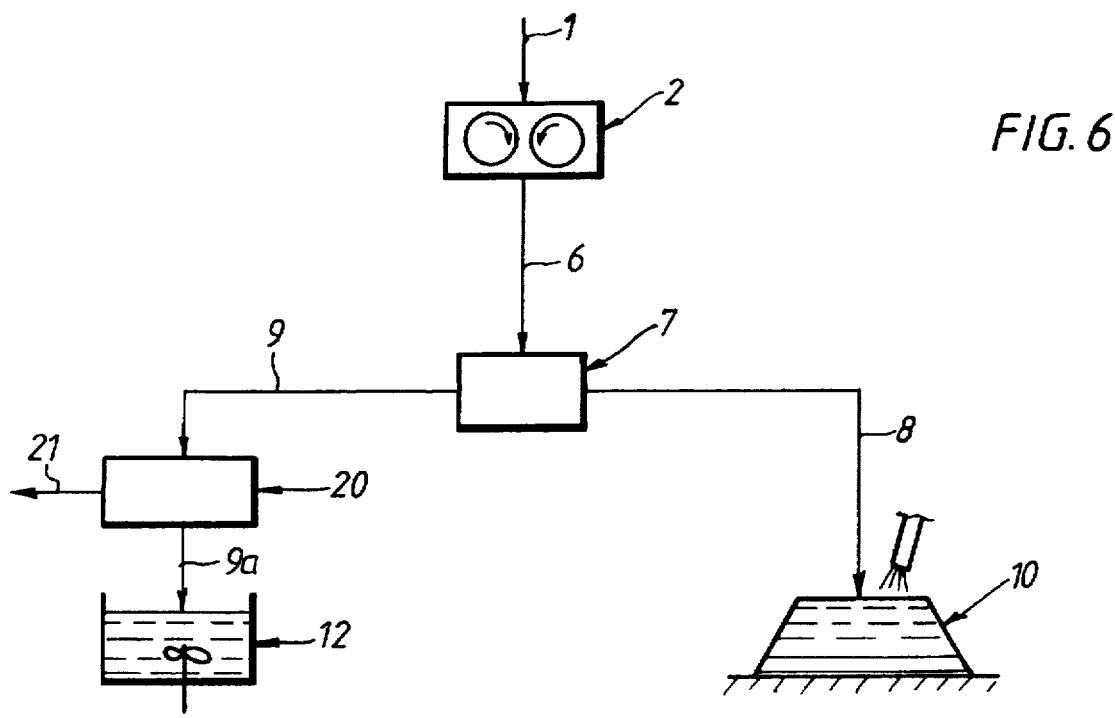

In FIG. 6 an embodiment is illustrated in which after the classifier 7 the oversize material is delivered in the same way to the heap 10 for the heap leaching. By contrast, after the classifier 7 and before the tank leaching in the tank 12 the fine material 9 is first of all delivered to an arrangement 20 for concentration of material. With the aid of this arrangement 20, in the case of certain ore materials it is possible first of all—before the tank leaching—in an advantageous manner to obtain a concentrate 21 which contains a relatively high valuable material fraction and therefore can already be drawn off from the fine material 9 before the tank leaching. This concentrate 21 can then for be sold for example as metal concentrate or can be melted. The remaining fraction 9a from the material concentration is then delivered as before to the leaching tank 12, but the load of the leaching tank 12 is relieved by the fraction of the concentrate 21 which has been drawn off, i.e. the consumption for the tank leaching can be correspondingly reduced.

Figure 7:
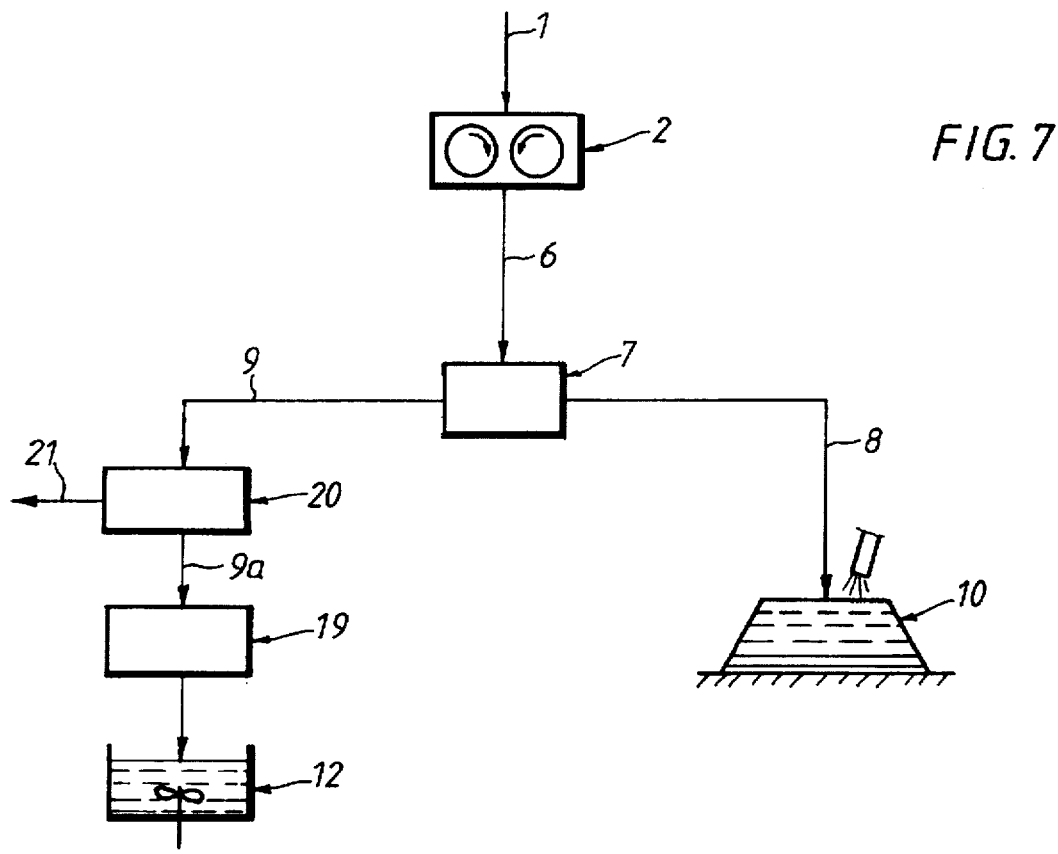

The further embodiment illustrated in FIG. 7 to some extent represents a fusion of the examples explained above with reference to FIGS. 5 and 6. Accordingly, after the classifier 7 the oversize material 8 is delivered to the heap 10 for the heap leaching. All of the fine material 9 is subjected to a material concentration in the arrangement 20 after the classifier 7 and before the leaching in the leaching tank 12 and also before the additional fine comminution in the fine comminuting device 19. From this material concentration the concentrate 21, which has a relatively high valuable material fraction, is drawn off in the manner explained above from the fine material 9, whilst the remaining fraction 9a of the fine material is broken up further in the fine comminuting device 19 and thereafter delivered to the tank leaching in the leaching tank 12. Thus in this case not only the leaching tank 12 but also the additional fine comminuting device 19 is relieved of the fraction of concentrate 21 which has been drawn off.

Figure 8:
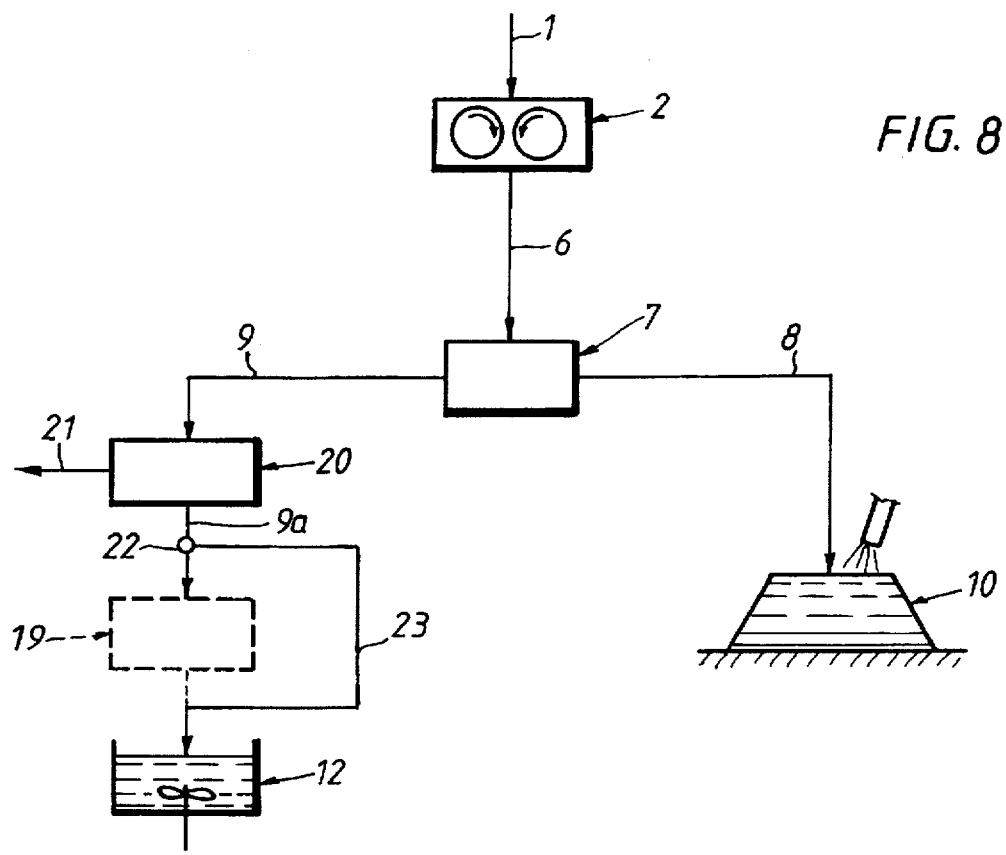

A variant of the procedure described above with reference to FIG. 7 is illustrated by the example in FIG. 8. According to this—as indicated by broken lines—the additional fine comminuting arrangement 19 can be connected in as required between the arrangement 20 for material concentration and the leaching tank 12 so that if need be for certain ore materials the metal particles most finely distributed therein are likewise broken up and thus made accessible for extraction. When this fine comminuting device 19 is used, however, it may also be advantageous to dispose an adjusting flap or distributor 22 in the connection between the arrangement 20 and the fine comminuting device 19, so that if need be the fine comminuting device 19 can be circumvented with the aid of a bypass conduit 23 and the fine material 9a coming out of the arrangement 20 can be delivered directly to the leaching tank 12.

Figure 9:
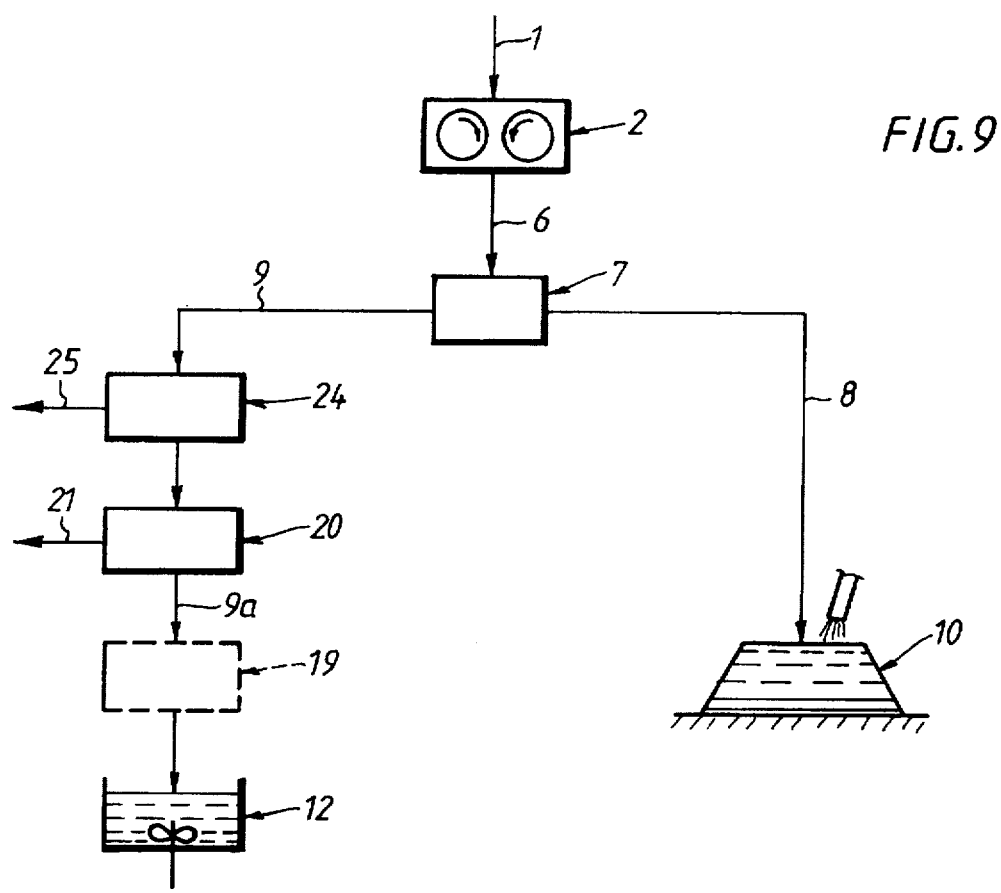

FIG. 9 shows a further configuration of the embodiment explained with reference to FIG. 7. According to this example (FIG. 9), the fine material 9 obtained in the classification in the classifier 7 is first of all delivered to a flotation arrangement 24 in which it is subjected to roughing flotation before it is delivered by way of the material concentrating arrangement 20 and the additional fine comminuting device 19 to the leaching tank 12. In this roughing flotation (in the flotation arrangement 24) a fraction of already exposed valuable substance can have been drawn off already from the fine material 9 at 25, so that the succeeding parts of the installation are correspondingly relieved of load, as a result of which in particular overgrinding of already exposed valuable substances can be avoided or at least reduced to a minimum. The arrangement of such a roughing flotation or coarse grain flotation before the tank leaching and also before any additional fine comminution which may be provided has the advantage that in the case of ore materials with greatly fluctuating valuable substance contents a proportionally higher yield of valuable substance can be achieved, as a result of which above all the subsequent tank leaching has a more uniform feed. A more uniform feed to the leaching process in turn simplifies the monitoring of the delivery of the leaching fluid and of the leaching operation. This leads overall to a higher yield of valuable substance to more favourable operating costs, to which a reduced consumption of leaching fluid or reagents contributes.

As is indicated in FIG. 9 by the representation in broken lines, if need be the fine comminuting device 19 can be omitted. Moreover, it is of course also possible to provide a bypass conduit in the region of this fine comminuting device 19, as was explained with reference to FIG. 8 (conduit 23).

As regards the carrying out of the roughing flotation, this can be carried out in any suitable flotation arrangement 24 which is known per se. However, care should be taken to ensure that this roughing flotation takes place in the region between the material bed comminution in the material bed roll mill 2 and the further breaking up in the fine comminuting device 19, preferably—as illustrated with the aid of FIG. 9—in the region between the classifier 7 and any arrangement 20 which may be provided for concentration of material. This roughing flotation should be used in particular to treat the relatively coarse metal particles contained in the fine material 9 which are already largely broken up and can be immediately removed from this preparation process as valuable substances.

Figure 10:
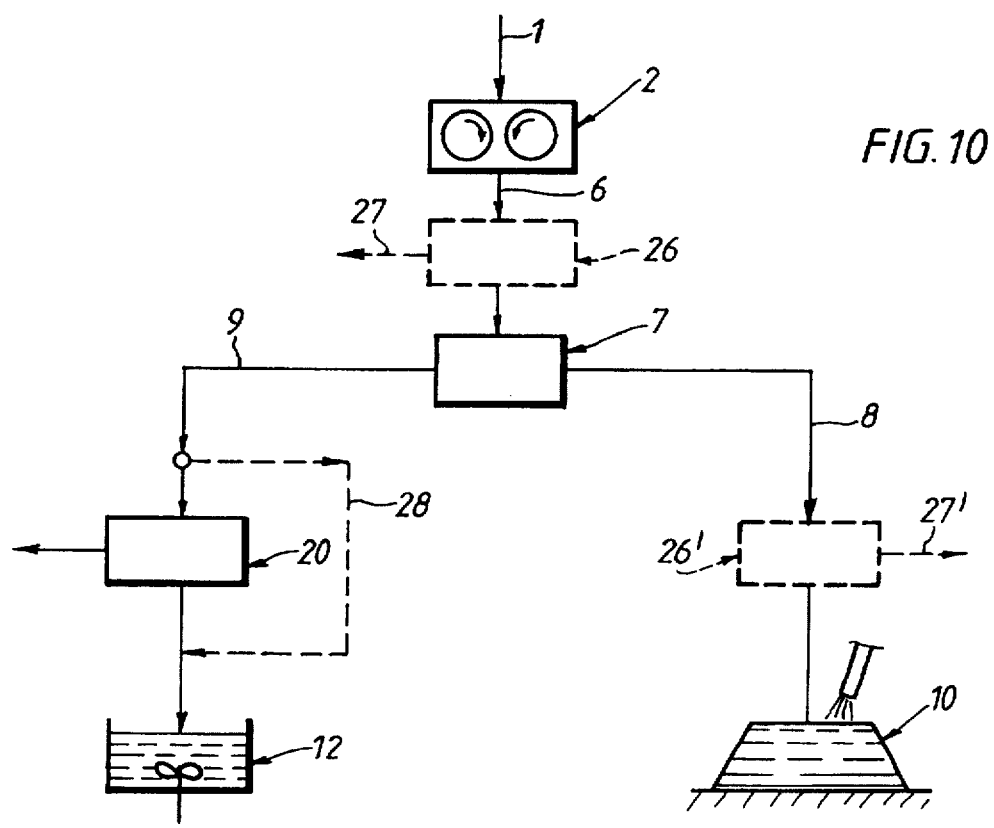

As can be seen from FIG. 10, the comminuted product 6 from the material bed roll mill 2 can also be subjected, before it is divided up in the classification stage 7, to a roughing flotation in a roughing flotation arrangement or cell 26—shown by broken lines—in which valuable substance concentrate can already be drawn off according to the broken line with arrow 27. As an alternative to this, i.e. instead of the arrangement of the roughing flotation arrangement 26 between the material bed roll mill 2 and the classifier 7, FIG. 10 also indicates by broken lines the possibility for the oversize material 8 coming from the classifier 7 to be subjected to roughing flotation in a similar roughing flotation arrangement or cell 26' before being put on the heap 10, and here again valuable substance concentrate is drawn off according to the arrow 27'. Thus in this case to some extent a roughing flotation on the one hand for the oversize material 8 and on the other hand for the fine material 9 are undertaken parallel to one another after the classifier 7. As a result of which the succeeding arrangements can be correspondingly relieved of load. The valuable substance concentrate obtained thereby can in each case be directly further processed in a suitable manner or can be immediately sold as concentrate. Just with regard to the heap leaching an extraction process lasting several weeks can then be avoided in relation to the valuable substance concentrate to be drawn off.

In connection with the procedural possibilities explained above with reference to FIG. 10 it may also be mentioned that when a roughing flotation of the comminuted product 6 from the material bed roll mill 2 takes place before the classifier, a flotation in the flotation arrangement 20 for the fine material 9 coming from the classifier 7 is generally no longer necessary, so that in this case the flotation arrangement 20 can then be circumvented with the aid of a bypass conduit 28—indicated by broken lines.

Figure 11:
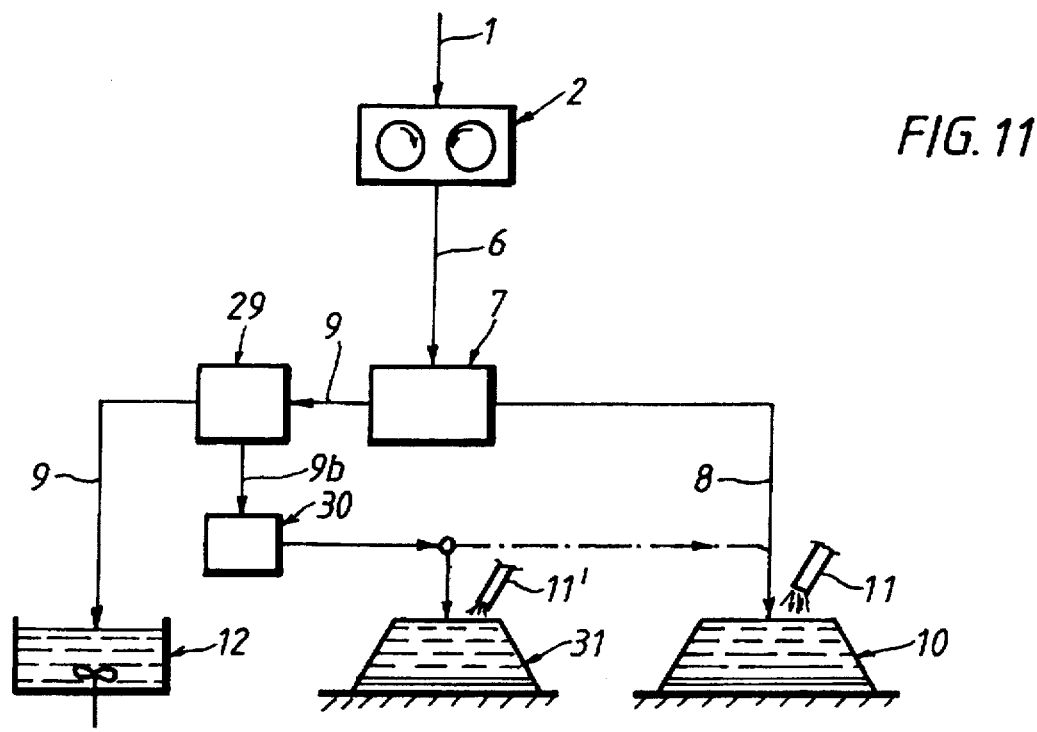

According to the further embodiment illustrated in FIG. 11 it is, furthermore, also possible for the fine material 9 obtained in the classification in the classification stage 7 also to be subjected first of all to fine classification in a secondary or fine classifier 29. From this fine classification the fine material 9 is then—in a similar manner to the preceding examples—delivered at least in part to the tank leaching 12, whilst the coarser material fraction 9b obtained in this fine classification is agglomerated in a suitable agglomeration stage or agglomerating arrangement 30 and then delivered to a heap leaching. This heap leaching can either—as illustrated by solid lines in FIG. 11—take place in a separate heap 31 which also has a suitable leaching fluid sprayed on it by way of a delivery arrangement 11' or—as indicated by broken lines in FIG. 11—delivered in part or in total to the first heap 10 to which the oversize material from the first classification stage 7 is also delivered. In the agglomerating arrangement 30 the coarser material fraction 9b coming from the fine classification 29 may also, depending upon the nature of this material, have a suitable binder added to it. The agglomeration of this coarser material fraction 9b can be carried out in any suitable arrangement, for example in an agglomerating drum, a pelletising table, a pelletising conveyor belt or the like.

Thus in this example according to FIG. 11 to a certain extent a coarser primary classification can be carried out in the classification stage 7 and a finer secondary classification can be carried out in the fine classification stage 29. This can be particularly effective for example when in the case of many ore materials the finer material fractions adhere somewhat more firmly on the coarser material fractions.

Figure 12:
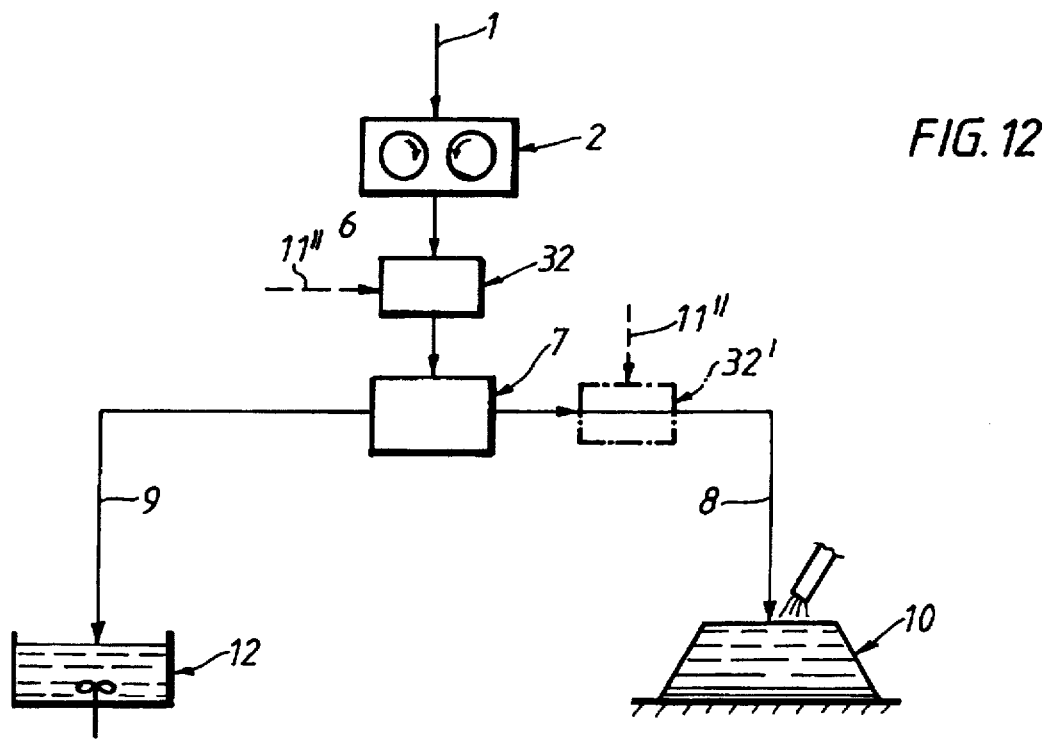

FIG. 12 shows possible ways in which a washing stage can also advantageously be connected in the region of the classification or classifier 7.

According to the embodiment illustrated by solid lines in FIG. 12, a washer 32 which forms the washing stage is disposed in the region between the material bed roll mill 2 and the classifier 7. Thus in this case the ore material 6 comminuted in the material bed comminution (material bed roll mill 2) is first of all also subjected to a washing operation in the washer 32 in which this comminuted ore material 6 is treated with an appropriate quantity of the leaching fluid. The delivered quantity of leaching fluid is indicated by the broken line and arrow 11".

However, instead of this there is also the possibility of subjecting only the oversize material 8 coming from the classification or classifier 7 to a washing operation in a suitable washer 32' before the heap leaching in the heap 10—as indicated by dash-dot lines in FIG. 12. In this case the oversize material 8 is likewise already advantageously treated with a quantity of the leaching fluid (indicated by the broken line and arrow 11").

The treatment of all of the comminuted ore material 6 before the classifier 7 or only the oversize material 8 after the classifier 7 has the advantage, for example, that in the case of particularly difficult ore materials the total reaction can be accelerated by the close contact of the leaching fluid with the ore particle. The arrangement of the washer 32' for the oversize material 8 after the classifier 7 proves advantageous above all when in the case of many ore materials the fine material or the fine material fraction in the total comminuted ore material 6 has a disruptive effect for the said washing operation.

The embodiments and variants of the method which are described above with reference to FIGS. 1 to 12 also make it clear that this extraction method according to the invention can be adapted in an extremely favourable way to the particular requirements for breaking up very different ore materials. In this case it is also possible without difficulty for the examples illustrated with the aid of FIGS. 1 to 12 to be combined with one another in other meaningful ways.

We claim:

1. Method of extracting metals from ore material, wherein this ore material is subjected to material bed comminution (2) in the grinding gap (3) between two rolls (4, 5) which are pressed against one another with high pressure and can be driven in opposite directions and comminuted material is leached by the addition of leaching fluid, characterised in that comminuted material (6) from the material bed comminution (2) is divided into oversize material (8) and fine material (9) in the classification in a classification stage (7), whereupon at least a fraction of the oversize material is subjected to heap leaching (10) and at least a fraction of the fine material is subjected to tank leaching (12) using a stirring movement.

2. Method as claimed in claim 1, characterised in that the classification (7) of the comminuted are material (6) into oversize material (8) and fine material (9) is preferably carried out in a screening device.

3. Method as claimed in claim 1, characterised in that an adjustable fraction (6a) of the comminuted ore material (6) is separated off before the classification (7) and recirculated to the material bed comminution (2).

4. Method as claimed in claim 1, characterised in that of the oversize material (8) obtained in the classification (7) an adjustable fraction (8a) is branched off and recirculated to the material bed comminution (2), whilst the remaining fraction is delivered to the heap leaching.

5. Method as claimed in claim 4, characterised in that the oversize material (8) obtained in the classification (7) is subjected to a second classification (18)—preferably in a screening device—from which the finer oversize material fraction (8b) is put on a heap (10) and is leached by the simultaneous addition of leaching fluid over the surface of the heap, whilst the coarser oversize material fraction (8a) is returned to the material bed comminution.

6. Method as claimed in claim 1, characterised in that the ore material (1a) is comminuted in a pre-comminuting arrangement (15) before its material bed comminution (2).

7. Method as claimed in claim 1, characterised in that at least an adjustable fraction of the fine material (9) obtained in the classification is subjected to fine comminution (19) for further breaking up of this fine material before the tank leaching (12).

8. Method as claimed in claim 7, characterised in that the fine comminution (19) of the fine material (9) takes place in a ball mill, an agitator mill or a further material bed roll mill.

9. Method as claimed in claim 7, characterized in that before the tank leaching (12) and before any additional fine comminution (19) fine material (9) is subjected to a material concentration (20) in which a concentrate containing a relatively high valuable material fraction is drawn off from the fine material.

10. Method as claimed in claim 1, characterised in that before the tank leaching (12) and before any additional fine comminution (19) fine material (9) is subjected to a material concentration (20) in which a concentrate containing a relatively high valuable material fraction is drawn off from the fine material.

11. Method as claimed in claim 1, characterised in that the fine material (9) obtained in the classification (7) is first of all subjected to roughing flotation (24) in which a fraction of already exposed valuable material is led off from the fine material, whilst the rest of the fine material is as required either delivered directly to the tank leaching (12) or is first of all subjected to an additional fine comminution (19) and then delivered to the tank leaching.

12. Method as claimed in claim 11, characterised in that after the roughing flotation (24) and before the tank leaching (12) as well as optionally before the additional fine comminution (19) the fine material (9) is also delivered to a material concentration (20) from which a concentrate (21) with relatively high valuable material fraction is drawn off.

13. Method as claimed in claim 1, characterised in that the tank leaching (12) of the fine material (9, 9a) is carried out with constant stirring movement in such a way that at least the majority of the fine material particles are kept out of contact with one another.

14. Method as claimed in claim 1, characterised in that the comminuted product (6) obtained in the material bed comminution (2) is subjected to a coarse grain flotation (26) from which the valuable substance concentrate is drawn off.

15. Method as claimed in claim 1, characterised in that the oversize material (8) obtained after the classification (7) is subjected before its heap leaching (10) to a coarse grain flotation (26) in which valuable substance concentrate (27) is drawn off.

16. Method as claimed in claim 1, characterised in that the fine material (9) obtained in the classification (7) is subjected to a fine material classification (29) from which the fine material (9) is delivered at least in part to the tank leaching (12) and a coarser material fraction (9b) is first of all agglomerated (30) and then delivered to a heap leaching (31; 10).

17. Method as claimed in claim 16, characterised in that the coarser material fraction (9b) from the fine classification (29) is agglomerated with or without the addition of a binder as required and this agglomerated material is then delivered to a separate heap leaching (31) or is delivered to the heap leaching (10) for the oversize material (8) from the first classification (7).

18. Method as claimed in claim 1, characterised in that the ore material (6) comminuted in the material bed comminution (2) is subjected before the classification (7) to a washing operation (32) in which it is already treated with a proportion of the leaching fluid.

19. Method as claimed in claim 1, characterised in that the oversize material (8) coming from the classification (7) is subjected before the heap leaching (10) to a washing operation (32') in which it is already treated with a proportion of the leaching fluid.

* * * * *

UNITED STATES PATENT AND TRADEMARK OFFICE
CERTIFICATE OF CORRECTION

PATENT NO. : 5,642,863
DATED : July 1, 1997
INVENTOR(S) : Norbert Patzelt et al

It is certified that error appears in the above-indentified patent and that said Letters Patent is hereby corrected as shown below:

Column 3, line 47, change "of" to -- off --.
Column 4, line 42, change "o" to -- of --.
Claim 2, line 2, change "are" to -- ore --.

Signed and Sealed this

Thirtieth Day of September, 1997

Attest:

BRUCE LEHMAN

Attesting Officer

Commissioner of Patents and Trademarks